United States Patent [19]

Clark et al.

[11] 4,115,080

[45] Sep. 19, 1978

[54] SEPARATION PROCESS

[75] Inventors: Michael J. Clark; Howard L. Rohrmoser, both of Ludington, Mich.

[73] Assignee: The Dow Chemical Company, Midland, Mich.

[21] Appl. No.: 721,019

[22] Filed: Sep. 7, 1976

[51] Int. Cl.² ............................................. B01D 47/02
[52] U.S. Cl. ......................................... 55/54; 55/71; 55/89
[58] Field of Search .................. 55/54, 71, 89, 90, 446

[56] References Cited

U.S. PATENT DOCUMENTS

| | | | |
|---|---|---|---|
| 2,845,137 | 7/1958 | Sebald | 55/54 X |
| 3,248,861 | 5/1966 | Lovercheck | 55/446 X |
| 3,422,599 | 1/1969 | Hildyard | 55/71 X |
| 3,582,262 | 6/1971 | Tomany | 55/71 X |
| 3,969,482 | 7/1976 | Teller | 55/71 X |

Primary Examiner—Charles N. Hart
Assistant Examiner—Robert H. Spitzer
Attorney, Agent, or Firm—J. M. Kuszaj

[57] ABSTRACT

A method for separating contaminants from steam is disclosed. The method comprises conveying water at the saturation temperature of the contaminated steam into an enclosed treatment scrubber containing a plurality of baffles. The water is continuously passed through the baffles at a predetermined velocity. Contaminated steam is counter-currently passed upward through the baffles to contact at least a portion of the contaminants with at least a portion of the water. Water, contaminants, and steam are recovered from the scrubber.

15 Claims, 2 Drawing Figures

SEPARATION PROCESS

BACKGROUND OF THE INVENTION

The present invention relates generally to the field of separation processes. More particularly, it relates to a method for separating contaminants from a vapor stream.

The need for suitable methods for effectively removing contaminants from process steam streams prior to discharge to the atmosphere is becoming increasingly important due to the more stringent limitations on the amount of contaminants that may be released to the atmosphere. A number of commercial processes for scrubbing vapor streams with a liquid to remove contaminants have been developed. Typical separation processes and apparatus are shown in U.S. Pat. Nos. 3,803,805 and 3,533,608. However, a simple, reliable separation process for effectively scrubbing contaminants from steam streams is still needed to meet the ecological demands of the market place. Therefore, it is desired to develop an economical and efficient process for the removal of contaminants from steam streams.

The present method provides such a simple, yet efficient method of removing contaminants from process steam streams, and in addition offers a number of advantages over conventional processes. For example, the contaminated scrubbing water removed in the present process (commonly termed "underflow") has a contaminant concentration considerably higher than "underflow" concentrations typically observed in other scrubbing processes such as Venturi scrubbers and spray towers. This increased concentration reduces the amount of scrubbing liquid required for efficient contaminant removal. More importantly, the negligible dilution of the underflow allows the contaminated scrubbing water to be recycled to a suitable evaporator. Conventionally, the typical underflow is uneconomical to evaporate and is discharged to the environment.

Another significant advantage of the present process is the reduction of large differences in the pressure of the steam entering and leaving the scrubber. In situations where the steam scrubbed by the present method is to be further used in subsequent processes, pressure drops across the scrubber are not only undesirable, but are also uneconomical.

Still another advantage of the present process is the elimination of contaminant plugging problems generally encountered in demisters, sieve plates, packed column and other similar method of contaminant removal.

These advantages and other benefits achieved by the present method will become clear by the following detailed description of the process.

SUMMARY OF THE INVENTION

A method for separating contaminants from steam has been developed. The method comprises conveying water at the saturation temperature of the contaminated steam into an enclosed treatment scrubber containing a plurality of baffles. The water is continuously passed through the baffles at a predetermined rate. Contaminated steam is concurrently passed upward through the baffles to contact the contaminants with the water and thereby remove at least a portion of the contaminants from the steam. The water and contaminants therein are recovered from the scrubber. Steam and water entrained therein are recovered from the scrubber.

DESCRIPTION OF THE DRAWINGS

The drawings further illustrate the present invention.

DESCRIPTION OF THE PREFERRED EMBODIMENT

Figures 1, 2:
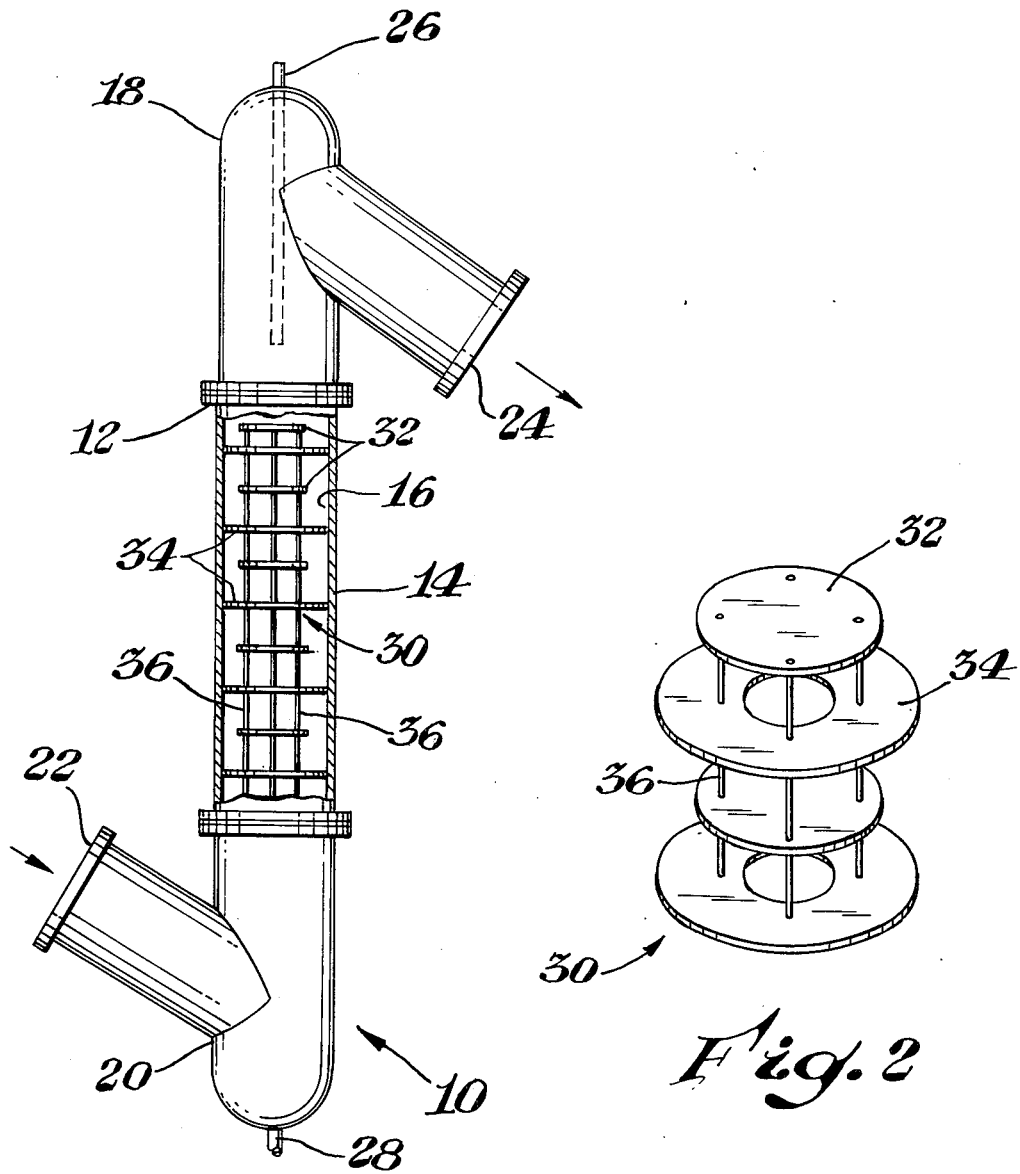
FIG. 1 is a view in front elevation, partly broken away and in section, showing an embodiment of a treatment scrubber useful for the removal of contaminants from steam in accordance with the present invention.
FIG. 2 is a view in front elevation showing in vertical section one embodiment of the baffles shown in the cut away view of FIG. 1.

Referring now to the drawing, there is depicted in FIG. 1 an enclosed treatment scrubber generally designated by the reference numeral 10. The scrubber 10 comprises a tubular body portion 12 having an exterior wall portion 14 and an interior wall portion 16. The body portion 12 includes an upper end 18, a lower end 20, a vapor inlet 22 near the lower end 20, and a vapor outlet 24 near the upper end 18.

A liquid inlet conduit 26 extends into the body 12 near the upper end 18, and is adapted to provide a source of scrubbing liquid such as water at a predetermined temperature and rate. A discharge conduit 28 for removing water and contaminants entrained therein extends from the body 12 near the lower end 20.

A plurality of impingement baffles 30, for bringing about intimate contact between the scrubbing liquid and the steam, are disposed within the interior of a portion of the body 12, as shown by the cut-away section of FIG. 1.

Preferably, as shown in FIG. 2, the baffles 30 include a generally vertically disposed series of alternating disk trays 32 and doughnut type trays 34. The outside perimeter of each of the doughnut type trays 34 abuts the interior wall portion 16 of the body 12, and preferably is attached to the interior wall portion 16 by suitable means, such as welding. Attached to each of the doughnut trays 34 by means of rods 36, or any other suitable support means, and in spaced apart relationship, are each of the disk trays 32. The disk trays 32 are generally circular and have a diameter slightly greater than the opening in the doughnut tray 34. While it is convenient to weld these disk trays to the surface of doughnut type trays 34 by means of rods 36, each of disk trays 32 can be attached to the doughnut trays 34 by other suitable means, such as by brackets. In selecting the number of disk trays 32 and doughnut type trays 34 to be used, and the vertical spacing between trays, the area transverse to the direction of flow should be sufficient to insure efficient contact between the scrubbing liquid and the contaminated steam.

While the scrubber unit 10 and the baffles 30 have been shown as substantially circular, in section, the configuration of both is subject to considerable variation. If desired, the scrubber 10 can be rectangular in section, with the baffles 30 in the form of alternating rectangular trays, and rectangular trays with the central portion thereof removed. However, in any configuration, the baffles should be of a suitable shape to conform to the interior wall portion 16 of body 12, and to eliminate any continuous fluid passageway along the interior wall portion 16 of body 12.

The materials from which the scrubber of the present process can be fabricated are also subject to considerable variation. However, it should be borne in mind that the scrubber construction material must be selected to minimize the effect of any corrosive environment created within the contacting zone wherein the contaminated steam impinges the scrubbing liquid.

In the separation of contaminants from process steam streams by the present method, a scrubbing liquid, preferably water, and more preferably water containing condensed steam, is conveyed into the interior of the scrubber 10 through the inlet conduit 26. The water is continuously passed in a generally downward direction through the interior of the body 12 at a predetermined rate and impinges upon the surface of the baffles 30. The water preferably forms a liquid screen which passes over and through the doughnut tray 34, moves radially across and around the disk tray 32, and exits through discharge conduit 28.

Preferably, the flow rate of the scrubbing water through the scrubber 10 should be sufficient to maximize the contact between the water and the steam and to minimize the amount of water discharged as waste through the discharge conduit. For example it has been found that conveying water into the scrubber 10 at a rate at least as large as the velocity of the incoming contaminated steam is satisfactory to remove entrained contaminants, from the contaminated steam at a pressure of 15 pounds per square inch gauge (psig). A water velocity of about twice that of the incoming contaminated steam has been used for removing entrained contaminants from 35 psig contaminated steam.

The scrubbing water is preferably maintained at a temperature corresponding to the temperature at which the contaminated steam is saturated with water at the pressure at which the contaminated steam is introduced into the scrubber. For example, when the contaminated steam is introduced into the scrubber at a pressure of about 35 psig, the scrubbing water is introduced into the interior of the body 12 at a temperature of about 140° C.

The contaminated steam enters body 12 through vapor inlet 22 and generally passes upward through the interior of the body 12. Although the steam can contain various contaminants, depending upon the source of the steam, it generally contains entrained chloride ions generally in the form of alkali and alkaline earth salts selected from the group consisting of calcium chloride, sodium chloride, calcium carbonate, calcium sulfate, potassium chloride, lithium chloride, and magnesium chloride. The contaminated steam can also contain a number of vaporized compounds, such as, gaseous hydrogen chloride.

Preferably, the contaminated steam to be scrubbed is superheated steam generated during the evaporation of an aqueous solution of calcium chloride. Consequently, the contaminated steam entering the body 12 is generally at the temperature and pressure at which the particular aqueous solution of calcium chloride boils.

The contaminated steam is passed into the scrubber 10 at a steam velocity sufficient to carry the steam through the scrubbing liquid in the body 12 and out the vapor outlet 24. Velocities up to about 3000 feet per minute have been found to give satisfactory contaminant removal and are preferred. However, variable steam velocities greater than 0 ft/min but below "flooded" condition can be used without reducing the efficiency of contaminate removal. "Flooded" condition in this context refers to the situation wherein vapor flowing at high rates countercurrent to a liquid in a vertical tube causes the liquid to surge in the tube, thus entraining considerable amounts of liquid in the vapor.

The contaminated steam passes through the body 12 and contacts the cascading film of water on the surface of the baffles 30 to exchange at least a portion of the contaminants for at least a portion of the water.

Preferably the water exiting through discharge conduit 28 contains a sufficient amount of contaminants therein that the concentration of the contaminated water is at least substantially identical to the concentration of the solution from which the steam was generated. For example, when the contaminated steam to be scrubbed is generated by boiling an aqueous solution of calcium chloride containing from about 40 to about 50 percent calcium chloride by weight, the contaminated water should contain at least about 40 percent calcium chloride by weight. Preferably the water and contaminants therein recovered from the scrubber are sufficiently concentrated that they can be heated to generate contaminated steam which is subsequently treated in accordance with the present process.

In another embodiment of the present process an additional medium suitable to react with at least a portion of the contaminants is introduced into the body 12. This medium is simultaneously passed through the scrubber 10 in a direction cocurrent to the direction of the water. Preferably, the medium introduced is capable of chemically reacting with at least a portion of any gaseous hydrogen chloride contained in the contaminated steam. Most preferably, the medium is an aqueous solution of a compound such as sodium hydroxide or calcium hydroxide that will yield one of the contaminants upon reaction with the gaseous hydrogen chloride. For example, sodium hydroxide can react with hydrogen chloride to yield sodium chloride and water.

In this embodiment, water, contaminants entrained therein, and sodium or calcium chloride formed by the reaction of the sodium or calcium hydroxide with hydrogen chloride are removed from discharge conduit 28 of the scrubber 10.

The following example is illustrative of the present process.

EXAMPLE 1

Employing an apparatus as generally depicted in the drawings, the treatment scrubber was constructed of a corrosion resistant alloy of predominantly nickel and copper manufactured under the trademark Monel ®. The scrubber had a 4-inch inside diameter and was 5 feet long. In the interior of the scrubber, ten stainless steel 3-inch diameter disks and ten stainless steel doughnut trays having an inside diameter of 2 inches and an outside diameter of 4 inches were installed. The distance between successive disks and doughnuts was maintained at 3 inches by using ¼ inch inside diameter stainless steel pipe for spacing bars between trays.

The steam treated by the present method was generated by concentrating an aqueous calcium chloride solution from about 45 to about 70 percent calcium chloride by weight in a forced circulation type evaporator. The contaminated steam contained a chloride ion concentration of about 400 parts per million and a pH of 2–3.

The steam, containing contaminants including entrained calcium chloride, calcium carbonate, calcium sulfate and gaseous hydrogen chloride, was pumped into the bottom of the scrubber at a rate of 392 lb/hr at a temperature of 210° C and a pressure of 35 psig.

Water at a temperature of 140° C was introduced into the top of the scrubber at a rate of about 740 pounds per hour.

An aqueous caustic solution with a concentration of 0.27 percent by weight sodium hydroxide was simultaneously passed through the scrubber in a downward direction cocurrently with the water by means of an input conduit located near the top of the body portion of the scrubber. The sodium hydroxide solution was at a temperature of about 30° C and was passed through the scrubber at a rate of 25.5 pounds per hour.

The contaminated steam passed through the scrubber exchanging entrained chloride ions for water and chemically reacting with a portion of the sodium hydroxide solution to form sodium chloride.

The water, chloride ions entrained therein, and the sodium chloride formed by the reaction of the sodium hydroxide with the hydrogen chloride were discharged from the bottom of the tower at a rate of 5.8 pounds per hour. The discharge had a temperature of 140° C and contained about 45 percent by weight calcium chloride and 0.52 percent by weight sodium hydroxide. The pressure drop through the scrubber was less than 1 pound per square inch.

At the top of the scrubber, steam and water vapor entrained therein were recovered at a rate of 1191 pounds per hour. The temperature of the steam was 140° C.

The chloride ion concentration of the treated steam showed a dramatic reduction from 400 parts per million to about 18 parts per million. The pH of the treated steam exhibited a similar dramatic increase from about 2–3 to about 7. The underflow was sufficiently concentrated (45 percent by weight calcium chloride) that it was recycled to the original 45 percent boiling calcium chloride solution for subsequent treatment by the present process.

What is claimed is:

1. A method for separating contaminants from steam comprising:
    (a) conveying water at a temperature corresponding to the temperature at which the contaminated steam is saturated with water at the pressure of the contaminated steam into an enclosed treatment scrubber containing a plurality of baffles;
    (b) continuously passing the water through the baffles at a predetermined rate;
    (c) countercurrently passing the contaminated steam upward through the baffles to contact the contaminants with the water, and thereby remove at least a portion of the contaminants from the steam;
    (d) recovering water and contaminants therein from the scrubber;
    (e) recovering steam and water entrained therein from the scrubber.

2. The method of claim 1 including simultaneously passing a medium suitable to react with at least a portion of the contaminants through the scrubber in a direction cocurrent with the water.

3. The method of claim 2 wherein the contaminants include gaseous hydrogen chloride.

4. The method of claim 2 wherein the medium is an aqueous solution of sodium hydroxide.

5. The method of claim 2 wherein the medium is an aqueous solution of calcium hydroxide.

6. The method of claim 1 wherein the contaminants include at least one member selected from the group consisting of calcium chloride, sodium chloride, calcium carbonate, calcium sulfate, potassium chloride, lithium chloride, and magnesium chloride.

7. The method of claim 1 wherein the contaminants are entrained within the steam.

8. The method of claim 1 wherein the contaminated steam is superheated steam generated during evaporation of an aqueous solution of calcium chloride.

9. The method of claim 8 wherein the contaminated steam is at a temperature and a pressure at which the aqueous solution of calcium chloride boils.

10. The method of claim 8 wherein the water recovered from the scrubber contains a sufficient amount of contaminants therein that the concentration of the contaminated water is at least as great as the concentration of the aqueous solution of calcium chloride.

11. The method of claim 10 wherein the contaminated water is heated to generate contaminated steam for repetitions of steps (a)–(e).

12. The method of claim 1 wherein the baffles in the interior of the scrubber comprise a vertical series of alternating, disk and doughnut-type baffle trays arranged to pass a cascading film of water through the doughnut baffle and around the disk baffle.

13. The method of claim 1 wherein the water passed through the scrubber contains condensed steam.

14. A method for removing entrained chloride ions and gaseous hydrogen chloride from steam generated by the evaporation of an aqueous solution of calcium chloride comprising:
    (a) introducing water at a temperature corresponding to the temperature at which the contaminated steam is saturated with water at the pressure of the contaminated steam into an enclosed treatment scrubber containing a plurality of baffles in the interior thereof;
    (b) introducing an aqueous solution of sodium hydroxide into the scrubber;
    (c) concurrently passing the water and sodium hydroxide solution concurrently through the scrubber at a rate sufficient to form a cascading film of water and sodium hydroxide on the surface of the baffles;
    (d) countercurrently passing contaminated steam through the scrubber to exchange at least a portion of the chloride ions for at least a portion of the water and to chemically react at least a portion of the hydrogen chloride with at least a portion of the sodium hydroxide;
    (e) recovering water, chloride ions entrained therein, and sodium chloride formed by reaction of the sodium hydroxide solution with the hydrogen chloride from one portion of the scrubber;
    (f) recovering steam and water entrained therein from another portion of the scrubber.

15. A method for removing entrained contaminants including at least one member selected from the group consisting of calcium chloride, calcium carbonate and calcium sulfate from steam comprising:
    (a) introducing condensed steam at a temperature corresponding to the temperature at which contaminated steam is saturated with water at the pressure of the contaminated steam into an enclosed treatment scrubber containing a plurality of baffles in the interior thereof;
    (b) passing the water through the scrubber at a rate sufficient to form a cascading film of water on the surface of the baffles;
    (c) countercurrently passing contaminated steam generated during the evaporation of an aqueous solution of calcium chloride through the scrubber;
    (d) recovering water and contaminants entrained therein from the bottom of the scrubber;
    (e) recovering steam and water entrained therein from the top of the scrubber.

* * * * *